US008599791B2

(12) United States Patent
Mukherjee et al.

(10) Patent No.: US 8,599,791 B2
(45) Date of Patent: Dec. 3, 2013

(54) METHOD AND APPARATUS TO ENABLE FALLBACK TO CIRCUIT SWITCHED DOMAIN FROM PACKET SWITCHED DOMAIN

(75) Inventors: Rajat P. Mukherjee, Stanford, CA (US); Mohammed Sammour, Alrabieh (JO); Shankar Somasundaram, Deer Park, NY (US); Catherine M. Livet, Montreal (CA); Ulises Olvera-Hernandez, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 755 days.

(21) Appl. No.: 12/408,028

(22) Filed: Mar. 20, 2009

(65) Prior Publication Data

US 2009/0238143 A1 Sep. 24, 2009

Related U.S. Application Data

(60) Provisional application No. 61/038,701, filed on Mar. 21, 2008.

(51) Int. Cl.
*H04W 4/00* (2009.01)

(52) U.S. Cl.
USPC .......................... 370/331; 370/328; 370/338

(58) Field of Classification Search
USPC ........................................................ 370/331
See application file for complete search history.

(56) References Cited

U.S. PATENT DOCUMENTS

| 7,251,227 | B2 * | 7/2007 | de Jong et al. | 370/331 |
| 7,596,121 | B2 * | 9/2009 | De Jong et al. | 370/331 |
| 7,853,258 | B2 * | 12/2010 | Xu et al. | 455/435.1 |
| 8,139,530 | B2 * | 3/2012 | Herrero-Veron | 370/329 |
| 8,155,053 | B2 * | 4/2012 | Wang et al. | 370/328 |
| 8,190,191 | B2 * | 5/2012 | Livet et al. | 370/331 |
| 8,224,363 | B2 * | 7/2012 | Aghili et al. | 370/352 |

(Continued)

FOREIGN PATENT DOCUMENTS

| EP | 2 434 942 | 8/2007 |
| EP | 1 892 897 | 2/2008 |
| GB | 2 434 942 | 8/2007 |
| WO | 2007/144028 | 12/2007 |

OTHER PUBLICATIONS

NTT DoCoMo et al., "CS Fallback WID", 3GPP TSG SA WG2 Meeting #62, TD S2-080861, (Marina Del Rey, California, Jan. 14-18, 2008).

(Continued)

*Primary Examiner* — Ian N Moore
*Assistant Examiner* — Jenee Alexander
(74) *Attorney, Agent, or Firm* — Frank M. Linguiti

(57) ABSTRACT

A method and apparatus are used to perform a Circuit Switched (CS) fallback in wireless communications. The Non-Access Stratum (NAS) of the apparatus determines whether to perform a CS fallback based on an Internet Protocol (IP) Multimedia Subsystem (IMS) registration status, and sends a service request indicating a request to perform the CS fallback when the WTRU is attached to a CS domain. The apparatus also includes an Access Stratum (AS) that receives the CS service request from the NAS, sends an indication of the CS service request in a Radio Resource Control (RRC) message to an Evolved Universal Mobile Telecommunications System (UMTS) Terrestrial Radio Access Network (E-UTRAN), wherein the RRC message includes CS service information, and receives a handover command in response to the CS service request.

11 Claims, 8 Drawing Sheets

(56) References Cited

U.S. PATENT DOCUMENTS

2004/0266435 A1* 12/2004 de Jong et al. ............... 455/436
2007/0238466 A1  10/2007 Buckley et al.
2010/0260099 A1* 10/2010 Frost et al. ................... 370/328

OTHER PUBLICATIONS

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.1.0 (Mar. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.4.0 (Dec. 2008).
Third Generation Partnership Project, "Technical Specification Group Services and System Aspects; Circuit Switched Fallbck in Evolved Packet System; Stage 2 (Release 8)", 3GPP TS 23.272 V1.0.0 (Mar. 2008).
Third Generation Partnership Project, "Technical Specification Group Services and System Aspects; Circuit Switched Fallbck in Evolved Packet System; Stage 2 (Release 8)", 3GPP TS 23.272 V8.0.0 (Jun. 2008).
Third Generation Partnership Project, "Technical Specification Group Services and System Aspects; Circuit Switched Fallbck in Evolved Packet System; Stage 2 (Release 8)", 3GPP TS 23.272 V8.3.0 (Mar. 2009).
Third Generation Partnership Project, "Technical Specification Group Core Network and Terminals; Non-Access-Stratum (NAS) protocol for Evolved Packet System (EPS); Stage 3 (Release 8)", 3GPP TS 24.301 V0.1.1 (Mar. 2008).
Third Generation Partnership Project, "Technical Specification Group Core Network and Terminals; Non-Access-Stratum (NAS) protocol for Evolved Packet System (EPS); Stage 3 (Release 8)", 3GPP TS 24.301 V8.0.0 (Dec. 2008).
Third Generation Partnership Project, "Technical Specification Group Core Network Mobile Radio Interface Layer 3 Specification; Core Network Protocols; Stage 3 (Release 1999)", 3GPP TS 24.008 V3.20.0 (Dec. 2005).
Third Generation Partnership Project, "Technical Specification Group Core Network and Terminals; Mobile Radio Interface Layer 3 Specification; Core Network Protocols; Stage 3 (Release 6)", 3GPP TS 24.008 V6.19.0 (Jun. 2008).
Third Generation Partnership Project, "Technical Specification Group Core Network and Terminals; Mobile Radio Interface Layer 3 Specification; Core Network Protocols; Stage 3 (Release 7)", 3GPP TS 24.008 V7.11.0 (Mar. 2008).
Third Generation Partnership Project, "Technical Specification Group Core Network and Terminals; Mobile Radio Interface Layer 3 Specification; Core Network Protocols; Stage 3 (Release 7)", 3GPP TS 24.008 V7.13.0 (Sep. 2008).
Third Generation Partnership Project, "Technical Specification Group Core Network and Terminals; Mobile Radio Interface Layer 3 Specification; Core Network Protocols; Stage 3 (Release 8)", 3GPP TS 24.008 V8.1.0 (Mar. 2008).
Third Generation Partnership Project, "Technical Specification Group Core Network and Terminals; Mobile Radio Interface Layer 3 Specification; Core Network Protocols; Stage 3 (Release 8)", 3GPP TS 24.008 V8.4.0 (Dec. 2008).
Third Generation Partnership Project, "Technical Specification Group Core Network and Terminals; Mobile Radio Interface Layer 3 Specification; Core Network Protocols; Stage 3 (Release 4)", 3GPP TS 24.008 V4.17.0 (Sep. 2007).
Third Generation Partnership Project, "Technical Specification Group Core Network and Terminals; Mobile Radio Interface Layer 3 Specification; Core Network Protocols; Stage 3 (Release 5)", 3GPP TS 24.008 V5.16.0 (Jun. 2006).
Third Generation Partnership Project, "Technical Specification Group Core Network and Terminals; Mobile Radio Interface Layer 3 Specification; Core Network Protocols; Stage 3 (Release 6)", 3GPP TS 24.008 V6.18.0 (Mar. 2008).
Third Generation Partnership Project, "Technical Specification Group Services and System Aspects; Circuit Switched Fallbck in Evolved Packet System; Stage 2 (Release 8)", 3GPP TS 23.272 V8.2.0 (Dec. 2008).
Third Generation Partnership Project, "Technical Specification Group Services and System Aspects; Architectural requirements (Release 6)," 3GPP TS 23.221 V6.3.0 (Jun. 2004).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.5.0 (Mar. 2009).
Third Generation Partnership Project, "Technical Specification Group Services and System Aspects; Architectural requirements (Release 8)," 3GPP TS 23.221 V8.3.0 (Dec. 2008).
Third Generation Partnership Project, "Technical Specification Group Services and System Aspects; Architectural requirements (Release 4)," 3GPP TS 23.221 V4.2.0 (Jun. 2002).
Third Generation Partnership Project, "Technical Specification Group Services and System Aspects; Architectural requirements (Release 5)," 3GPP TS 23.221 V5.11.0 (Sep. 2004).
Third Generation Partnership Project, "Technical Specification Group Services and System Aspects; Architectural requirements (Release 7)," 3GPP TS 23.221 V7.2.0 (Dec. 2007).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.0.0 (Mar. 2009).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.0.0 (Dec. 2007).
NTT DOCOMO, Inc. et al., "CS Fallback: Overview and Open Issues," 3GPP TSG-RAN WG2, R2-080027 (Jan. 14-18, 2008).
Third Generation Partnership Project, "Technical Specification Group Core Network and Terminals; Mobile Radio Interface Layer 3 Specification; Core Network Protocols; Stage 3 (Release 4)", 3GPP TS 24.008 V4.17.1 (Sep. 2007).
Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).
Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).
Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).
Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).
Third Generation Partnership Project, "Technical Specification Group Services and System Aspects; General Packet Radio Service (GPRS); Service description; Stage 2 (Release 7)," 3GPP TS 23.060 V7.6.0 (Dec. 2007).
Third Generation Partnership Project, "Technical Specification Group Services and System Aspects; General Packet Radio Service (GPRS); Service description; Stage 2 (Release 7)," 3GPP TS 23.060 V7.8.0.(Sep. 2008).
Third Generation Partnership Project, "Technical Specification Group Services and System Aspects; General Packet Radio Service (GPRS); Service description; Stage 2 (Release 8)," 3GPP TS 23.060 V8.4.0 (Mar. 2009).

* cited by examiner

METHOD AND APPARATUS TO ENABLE FALLBACK TO CIRCUIT SWITCHED DOMAIN FROM PACKET SWITCHED DOMAIN

CROSS REFERENCE TO RELATED APPLICATIONS

This application claims the benefit of U.S. Provisional Application No. 61/038,701 filed on Mar. 21, 2008, which is incorporated by reference as if fully set forth.

TECHNOLOGY FIELD

This application is related to wireless communications.

BACKGROUND

The goal for the Third Generation Partnership Project (3GPP) Long Term Evolution (LTE) program is to provide improved spectral efficiency, reduced latency, and to enhance utilization of the radio resource to bring faster user experiences with reduced cost.

Since LTE is a Packet Switched (PS)-only radio technology that is initially likely to be supported only in packets, it is necessary to support backwards mobility with legacy Global System for Mobile communication (GSM), which is ubiquitous and may be assumed to exist everywhere. It was assumed that for inter-working with legacy Circuit Switched (CS) networks (such as GSM) operators would deploy Internet Protocol (IP) Multimedia Subsystem (IMS) networks. Specifically, Voice Call Continuity (VCC) was expected to be the technique used for handing over voice calls from LTE PS, using Voice Over Internet Protocol (VoIP) techniques, to legacy CS. However, it would also be desirable to de-couple IMS deployments from LTE deployments. In other words, operators would like to use their deployed CS infrastructure for voice calls while deploying LTE initially for high-speed PS services only. For this reason operators would like to see the initial release of LTE equipped with a feature (termed as "CS Fallback") which would allow a multi-mode wireless transmit/receive unit (WTRU) (LTE+GSM and/or WCDMA) to use the LTE network for high-speed PS data traffic while reverting to legacy CS network for voice traffic without necessarily using any IMS features such as VCC.

In general, when the WTRU attaches to the Evolved Packet System (EPS) over the Evolved Universal Mobile Telecommunications System (UMTS) Terrestrial Radio Access Network (E-UTRAN) network the Non Access Stratum (NAS) layer Attach message will include a "CS Fallback Indicator" that would indicate to the network the need to attach the WTRU in the CS domain as well. The Mobile Management Entity (MME) would then perform the attachment on behalf of the WTRU to the CS domain before indicating the completion of the process in the Attach Accept message as shown below.

FIG. 1 is a diagram of the procedure 100 for the CS fallback in the EPS. Referring to FIG. 1, the wireless transmit receive unit (WTRU) 110 initiates the attach procedure by the transmission of an Attach Request message 120 (e.g., CS fallback indicator message to the MME 130). The CS fallback indicator 120 indicates that the WTRU 110 is capable and configured to use CS fallback. An EPS Attach procedure 140, such as the procedure described in 3GPP TS 23.401, is then performed.

The visitor location register (VLR) (not shown) is updated according to the combined GPRS/IMSI Attach procedure, if the Attach Request message 120 includes a Combined Update indicator. The VLR number is derived from the International Atomic Time (IAT). The MME starts the location update procedure 150 towards the new Mobile Switching Caller (MSC)/VLR 160 upon receipt of the first Insert Subscriber Data message (not shown) from the Home Subscriber Service (HSS) 170. This operation marks the WTRU 110 as EPS-attached in the MSC/VLR.

The MME 130 then sends a Location Update Request (new Location Area Identity (LAI), IMSI, MME address, Location Update Type) message 180 to the VLR 160. New LAI is determined in the MME 130 based on mapping information from the TA (not shown). A mapped LAI could be for either GERAN or UTRAN based on an operator configuration. The VLR 160 creates an association 190 with the MME 130 by storing MME address. The VLR 160 performs Location Updating procedure 192 in CS domain. The VLR 160 responds with Location Update Accept 194 (VLR temporary mobile subscriber identity (TMSI)) to the MME 130. The MME 130 sends an Attach Accept (e.g., location area (LA), VLR TMSI) message 196 to the WTRU 110. The existence of LA and VLR TMSI indicates successful attach to CS domain.

Existing high-level signaling for preparing and executing fallback procedures for Mobile Originating (MO) and Mobile Terminating (MT) voice calls in Active Mode has several unresolved issues. For example, one issue is that some networks may support voice in LTE (using IMS/VCC) and some might not. Depending on the capabilities of the network, the telephony client in the WTRU application processor must determine whether to route MO calls to the PS domain (and request a PDP context activation from the ESM sub-layer in the NAS) or to the CS domain (and request a call to be setup).

Another unresolved issue is how call control in the WTRU is handled. If the call originated in the CS domain within the WTRU (because the network did not support IMS), the call would typically be routed to the CC/MM protocols within the WTRU and the EMM sub-layer would be unaware of the request.

Alternatively, if the WTRU started by using PS for voice it would use a VoIP client application which would request an IP address from the ESM layer (EPS Session Management) in the NAS. The ESM layer in turn would contact the EMM (EPS Mobility Management) layer which would interact with the RRC to setup the connection. At this point the LTE network would order the WTRU to "fall back" to the CS domain. However once the WTRU "falls back" to the CS domain, the call is now routed to the CS domain within the WTRU and the MM/CC protocols are responsible for this connection.

It would be desirable to provide this indication of "fallback complete" to the CS voice client and the Call control/Mobility Management (CC/MM) protocols within the WTRU and transfer the call control from the VoIP client/ESM/EMM to the CS call client/CC/MM. Accordingly, there exists a need for an improved method and apparatus to enable fallback to the CS domain from the PS domain.

SUMMARY

A method and apparatus for performing a Circuit Switched (CS) fallback in wireless communications. The Non-Access Stratum (NAS) of the apparatus determines whether to perform a CS fallback based on an Internet Protocol (IP) Multimedia Subsystem (IMS) registration status, and sends a service request indicating a request to perform the CS fallback when the WTRU is attached to a CS domain. The apparatus also includes an Access Stratum (AS) that receives the CS service request from the NAS, sends an indication of the CS service request in a Radio Resource Control (RRC) message to an Evolved Universal Mobile Telecommunications System (UMTS) Terrestrial Radio Access Network (E-UTRAN), wherein the RRC message includes CS service information, and receives a handover command in response to the CS service request.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (WTRU), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an enhanced Node-B (eNB), a site controller, an access point (AP), or any other type of interfacing device capable of operating in a wireless environment. In the embodiments described herein, the MSC/VLR may include an MCS, a VLR, or both.

Figure 1:
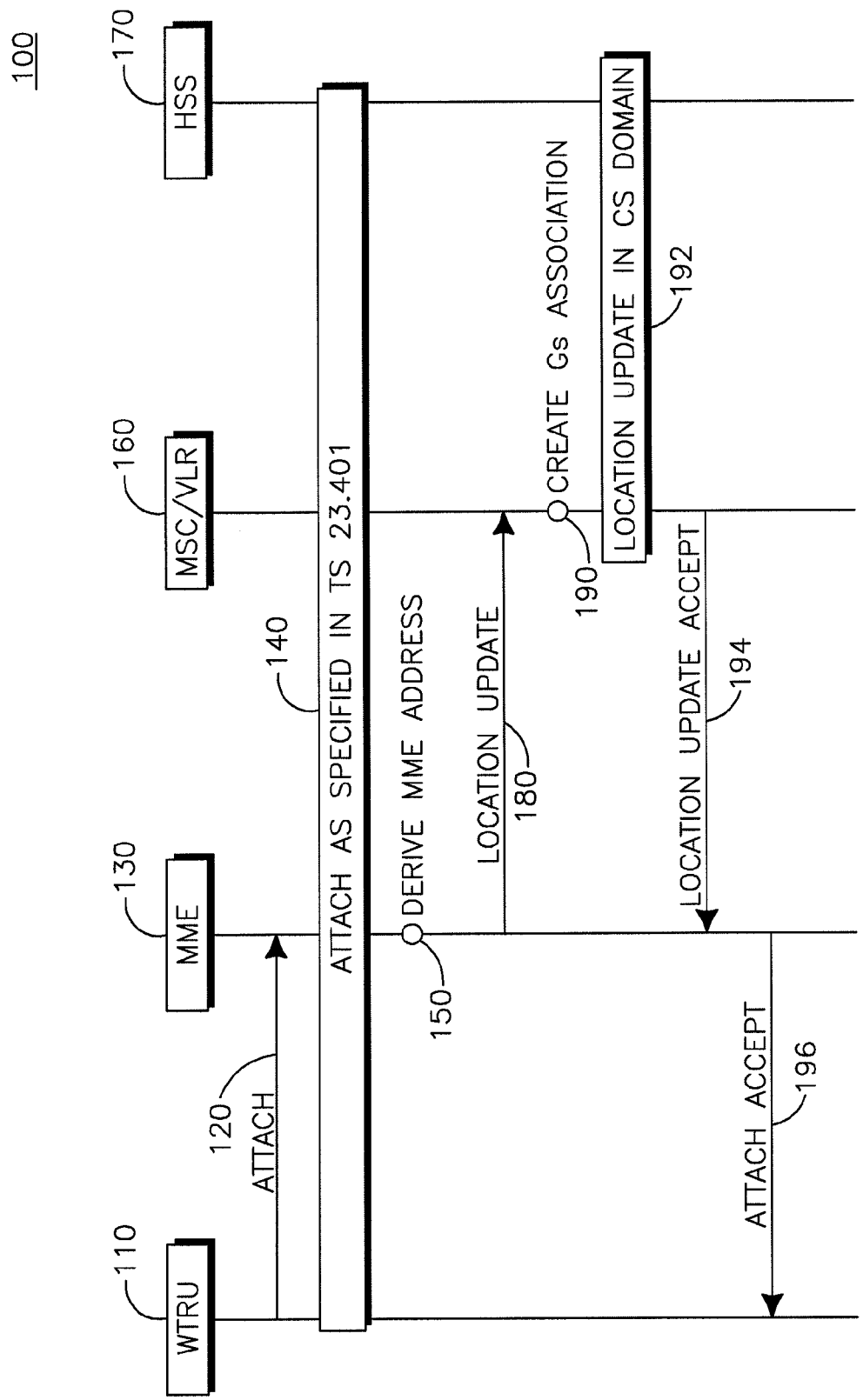
FIG. 1 is a diagram of an example attach program.
Figure 2:
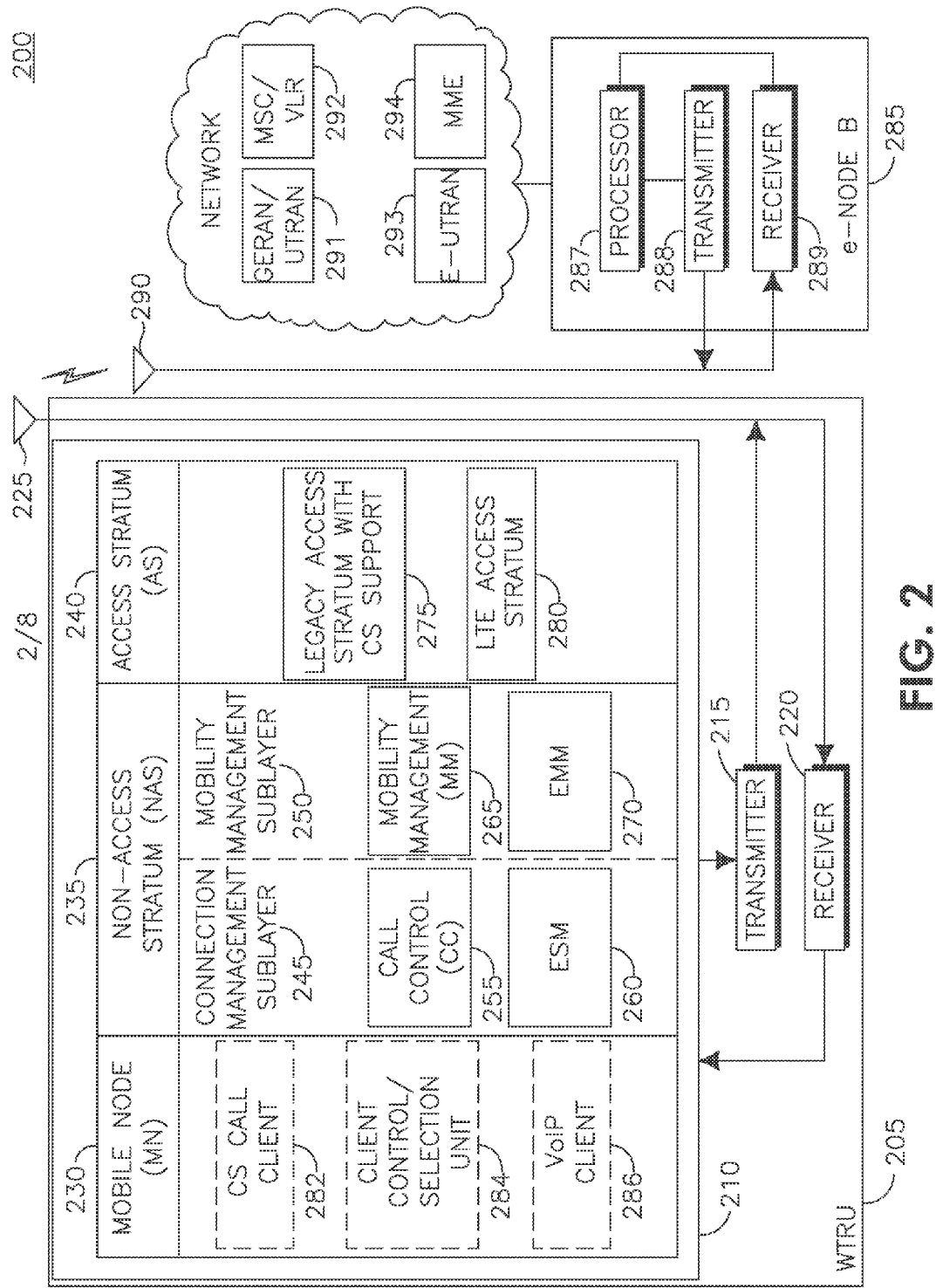
FIG. 2 is a diagram of an example WTRU and an e-Node B (eNB) configured to perform CS fallback.

FIG. 2 is a diagram of an example WTRU and an e-Node B (eNB) configured to perform CS fallback. The WTRU 205 comprises a processor 210, a transmitter 215, a receiver 220, and an antenna 225. The processor 210 includes a protocol stack comprising a Mobile Node 230 (MN), a Non-Access Stratum 235 (NAS), and an Access Stratum 240 (AS). The NAS 235 is divided into a connection management sub-layer 245 and a mobility management sub-layer 250. The connection management sub-layer 245 includes a call control (CC) unit 255 and an EPS session management (ESM) unit 260. The mobility management sub-layer 250 includes a mobility management (MM) unit 265 and an EPS mobility management (EMM) 270 unit. The AS 240 includes a legacy AS 275 that supports CS and an LTE AS 280. The MN 230 may optionally include a CS Call Client 282, a Client Control/Selection unit 284, and a VoIP Client 286.

Referring to FIG. 2, the e-Node B 285 (eNB) comprises a processor 287, a transmitter 288, a receiver 289, and an antenna 290. The enb 285 is configured to communicate with a GERAN/UTRAN unit 291, a MSC/VLR unit 292, an E-UTRAN unit 293, and a MME unit 294 in the network.

In accordance with the method and apparatus described herein, the LTE network has the ability to indicate to WTRUs whether it supports Single-Radio (SR)-VCC. This support automatically indicates to the terminal that the network supports VoIP and has the ability to handover a voice session to the circuit switched (CS) domain. This indication may be provided on the broadcast channel or on any RRC/NAS message. This indication may be accomplished, for example, by setting a single bit. Alternatively more bits may be used to indicate each feature separately, for example support for VoIP and/or support for IMS and/or support for SR-VCC.

Alternatively, the network may pre-configure a USIM in a UMTS IC Card (UICC) (not shown) or configure the USIM through an OMA device management protocol to indicate its capability, for example, using the selective disabling of 3GPP User Equipment Capabilities (SDoUE) feature as introduced in R7. The WTRU would then read the network capability through its USIM or through a Management Object (MO).

The method and the WTRU may have the ability to indicate to networks whether the WTRU supports Single-Radio VCC. This support may automatically indicate to the network that the WTRU supports VoIP, is IMS enabled, and has the ability to handover a voice session to the CS domain. This indication may be provided on any RRC/NAS message. This indication may be accomplished, for example, by setting a single bit. Alternatively more bits may be used to indicate each feature separately, for example support for VoIP and/or support for IMS and/or support for single-radio VCC.

The following four high-level example situations arise for multi-mode terminals. In the following examples, it is assumed that CS fall back is a mandatory feature supported by networks. The first situation arises for LTE Network and WTRU support for SR-VCC and VoIP. In this case, if the WTRU is on an LTE network and has a mobile originating (MO) call, it uses its VoIP client to setup the call. It may use the CS call client and fallback as directed by network. The decision to use the fall back procedure may be made either by the network or the WTRU. For example, the decision may be based on CS and PS resource availability, whether the WTRU has other PS services ongoing, or on network coverage. The decision may be made by the WTRU and based on, for example, the QoS expected for the Voice Call. When only low rate VoIP is available, the WTRU may decide to fall back to CS for increasing the call quality.

The second situation arises when the WTRU supports SR-VCC and VoIP over LTE, but the LTE network does not support SR-VCC and/or VoIP in LTE. In this case, if the WTRU is on the LTE network and has a MO call, it uses its CS call client to setup the call and uses the CS Fallback procedures, as defined later. In this example, the WTRU is aware of the network capabilities based on information received on the broadcast channel or on NAS messaging.

The third situation arises when the WTRU does not support SR-VCC and/or VoIP over LTE, but the LTE network does support SR-VCC and/or VoIP in LTE. In this example, if the WTRU is on the LTE network and has a MO call, it uses its CS call client to setup the call and uses the CS Fallback procedures as will be defined below.

The fourth situation arises when neither the WTRU nor the network support SR-VCC and/or VoIP over LTE. In this example, if the WTRU is on the LTE network and has a MO call, it uses its CS call client to setup the call and uses the CS Fallback procedures as will be defined below.

These four example methods also include receiving the capability notification as defined earlier. This capability notification may be provided to higher layer applications to enable the selection of the correct call client. New attention (AT) commands and other primitives for the exchange of this information between the modem (AS/NAS) and the application may also be included in this method.

The decision to fallback to CS, or the decision to initiate a call using the CS or PS domain call client, may be based on the IMS Registration status of the WTRU and may be made by the WTRU or the network. Accordingly, the method may include performing a call setup in the WTRU with EMM control. In this example, it is assumed that the network has no IMS support and that during the Initial Attach procedure the EMM sub-layer in the WTRU NAS is attached to the MME. As part of this method, the MM sub-layer may also be attached to the MSC/VLR in the CS domain by performing a Location Area Update. The MM sub-layer in the WTRU is thus in MM IDLE_NORMAL SERVICE state and the update status is U1, where U1 indicates that the last location updating attempt was successful. In general, the update status may indicate the state of the NAS sub-layers, and whether they have changed as a result of the location updating procedure.

Figure 3:
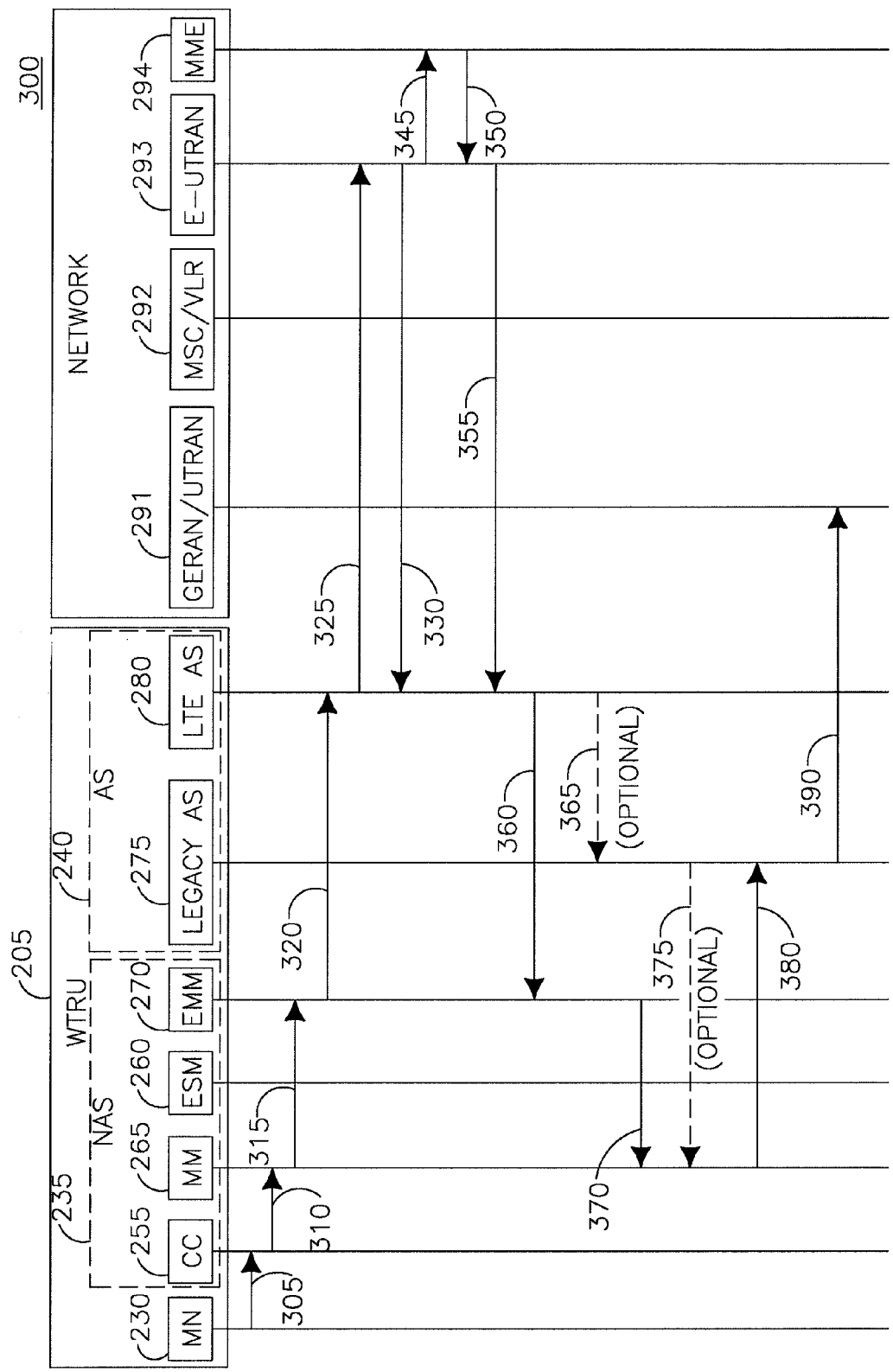
FIG. 3 is a signal flow diagram 300 of an example Mobile Originating (MO) call in Idle mode.

FIG. 3 is a signal flow diagram of a method 300 for Mobile Originating (MO) call in Idle mode. When a call is initiated in the CS domain while the WTRU is in Idle mode on LTE, the MM sub-layer 259 in the NAS 235 notifies the EMM sub-layer 270 of the NAS 235 of the request.

Referring to FIG. 3, an "MNCC_SETUP_REQ" primitive is sent 305 by the MN 230 to the CC 255 over a MNCC-SAP defined for the WTRU to initiate an MO establishment of a normal voice call. In response to receiving the "MNCC_SETUP_REQ" primitive, an "MMCC_EST_REQ" primitive is sent 310 by the CC 255 to the MM 265 over a MMCC-SAP, defined for the WTRU 205 to establish an MM connection. An "MMEMM_NOTIFY_REQ" primitive is sent 315 by the MM 265 to the EMM 270 to notify the EMM 270 of the MO CS call or MO CS service. The "MMEMM_NOTIFY_REQ" may be called by some other name without altering the basic concept.

The EMM 270 then sends 320 a Service Request to the LTE AS 280. The Service Request may be, for example, an MO CS service request or any other NAS EMM/ESM message with a similar intent to establish an S1 signaling connection with the MME 294. Included in the message sent is an indication "CS service" or some other cause value with a similar intent. The EMM 270 sends this message 320 to the LTE AS 280 after performing ciphering and/or integrity protection of the EMM message (not shown), if necessary. The EMM 270 may provide the LTE AS 280 with an indication of the originating CS service separate from the NAS message being sent and may also provide a description, such as whether it is conversational or streaming.

Alternatively, the MM layer 250 may indicate directly to the RRC layer of the LTE AS 280 of an MO CS service being initiated (not shown). This indication may include a description of the service (e.g., conversational, background).

In another alternative, the LTE AS 280, may initiate a cell reselection procedure and prioritize the selection priority of GERAN/UTRAN access (i.e. prioritize the Radio Access Technology (RAT) that supports CS service). Once the GERAN or UTRAN has been selected, the WTRU 205 may provide an indication of the fallback to CS cell to the NAS 235 disclosed below, or proceed to any later step.

Referring back to FIG. 3, the LTE AS 280 initiates 325 procedures to acquire an RRC Connection. This may involve a RACH access and an RRC CONNECTION REQUEST. The LTE AS 280 may set the establishment cause in the RRC CONNECTION REQUEST to a value that indicates an originating CS service. Although LTE is a PS only access technology, the AS may also set the Domain Indicator information element (IE) in the RRC CONNECTION REQUEST to the CS domain. The establishment cause may also provide details of the CS service (e.g. "Originating Streaming Call", "Originating Background Call" etc.).

In an alternative (not shown), a new RRC message called "EVENT NOTIFICATION" may be sent by the WTRU 205 after the RRC connection is established. This message indicates to the eNB 285 that an MO CS service request was received. The RRC may then start a timer after sending this message. If the timer expires before a HANDOVER FROM E-UTRAN COMMAND or equivalent message, or any other message as defined above is received the WTRU 205 may move to Idle mode and re-select to a cell with CS service available.

Once the RRC CONNECTION REQUEST is received with the cause value being set to "Originating CS service" or a cause with a similar intent, the eNB 285 may send 330 an RRC CONNECTION SETUP message to setup Signaling Radio Bearers (SRBs). The SETUP message may be, for example, a single bit and include an indication of eNB-initiated Relocation for CS services. If this indication is present, or based on some other parameters, the RRC layer in the WTRU 205 may decide not to try to initiate an uplink (UL) DIRECT TRANSFER procedure to send the upper layer NAS message. A T300 timer is started upon transmission of an RRC CONNECTION REQUEST. The timer is stopped when the WTRU 205 receives an RRC CONNECTION SETUP. If the timer expires and the WTRU 205 does not receive the RRC CONNECTION SETUP, the WTRU 205 may then retransmit the RRC CONNECTION REQUEST or abort the establishment procedure with the network if it has already transmitted a sufficient number of RRC CONNECTION REQUESTs.

The WTRU 205 may stop timer T300 when it receives the message and may start some other timer T1, which will help the WTRU 205 decide the duration of time it needs to wait before it goes back to idle. Alternatively, the eNB 285 may send a RRC CONNECTION REJECT message or some other RRC message which may include redirection info for the WTRU indicating the target RAT, the target frequency, or the target cell. In this alternative, the message may also indicate the initiation of the relocation. The WTRU 205, upon receiving this message would stop timer T300, move to Idle mode and re-select to the indicated RAT, frequency, or cell if indicated. If this is done, the WTRU RRC may send a variety of indications which will be discussed below. Another alternative includes sending a new RRC message called "EVENT NOTIFICATION RESPONSE", which indicates to the WTRU 205 that EVENT NOTIFICATION was received. This RRC message may be called by some other name without changing the principle. As such, when the WTRU 205 receives the EVENT NOTIFICATION RESPONSE message, the WTRU 205 may stop Timer T300 and start another timer which will help the WTRU 205 decide the amount of time it needs to wait before it switches to Idle mode.

Any combination of the above alternatives may be used. If an RRC Connection and SRBs were setup, the eNB 285 may initiate a measurement procedure so that it may determine to which cell to relocate the WTRU 205. Accordingly, the WTRU 205 may also perform measurements and send the measurement reports to the eNB 285.

The eNB 285 may then either send 345 the UPLINK NAS TRANSPORT message to the MME 294 with the WTRU NAS message or, after receiving an RRC CONNECTION REQUEST with the establishment cause set to originating CS service, send a RELOCATION REQUIRED message to the MME 294 with a description of the originating CS service.

The MME 294 then sends 350 a RELOCATION COMMAND after reserving resources for the originating CS service with the target MSC/NB/BS. Alternatively, the MME 294 may also send a NAS message to the WTRU 205 (e.g., SERVICE REJECT).

The eNB 285 then sends 355 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name, but which accomplishes a similar purpose. This RRC message may include an upper layer NAS message.

In response to receiving the Handover command, the RRC layer in LTE may provide an indication 360 of the fallback to CS cell to the NAS 235. This indication may also be used to send any received NAS message using a primitive. The RRC layer in LTE access 280 may also indicate 365 to the target access the parameters received in the handover. The target access may use these parameters to synchronize with the target cell. The target access may also confirm receiving the parameters or successful handover to the LTE access using a primitive. The EMM entity 270 may indicate 370 to the MM layer 265 that the terminal is now operating in the CS domain in A/Gb or Iu mode. The RRC, or equivalent layer in target access, may provide 375 an indication of the fallback to CS cell to the NAS 235 via a primitive.

The responses to receiving the Handover command may be in any order and are not intended to be sequential, and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify a CS fallback command received, initiated, or completed.

The WTRU NAS 235 is operating 380 in A/Gb or Iu mode and the MM layer is active. As such, it may initiate 385 call setup procedures as per usual with the access stratum of the target access, which is now the current access. The RRC, or equivalent layer of the target (now current) access, may begin 390 its defined procedures for receiving a MO CS Call request.

Figure 4:
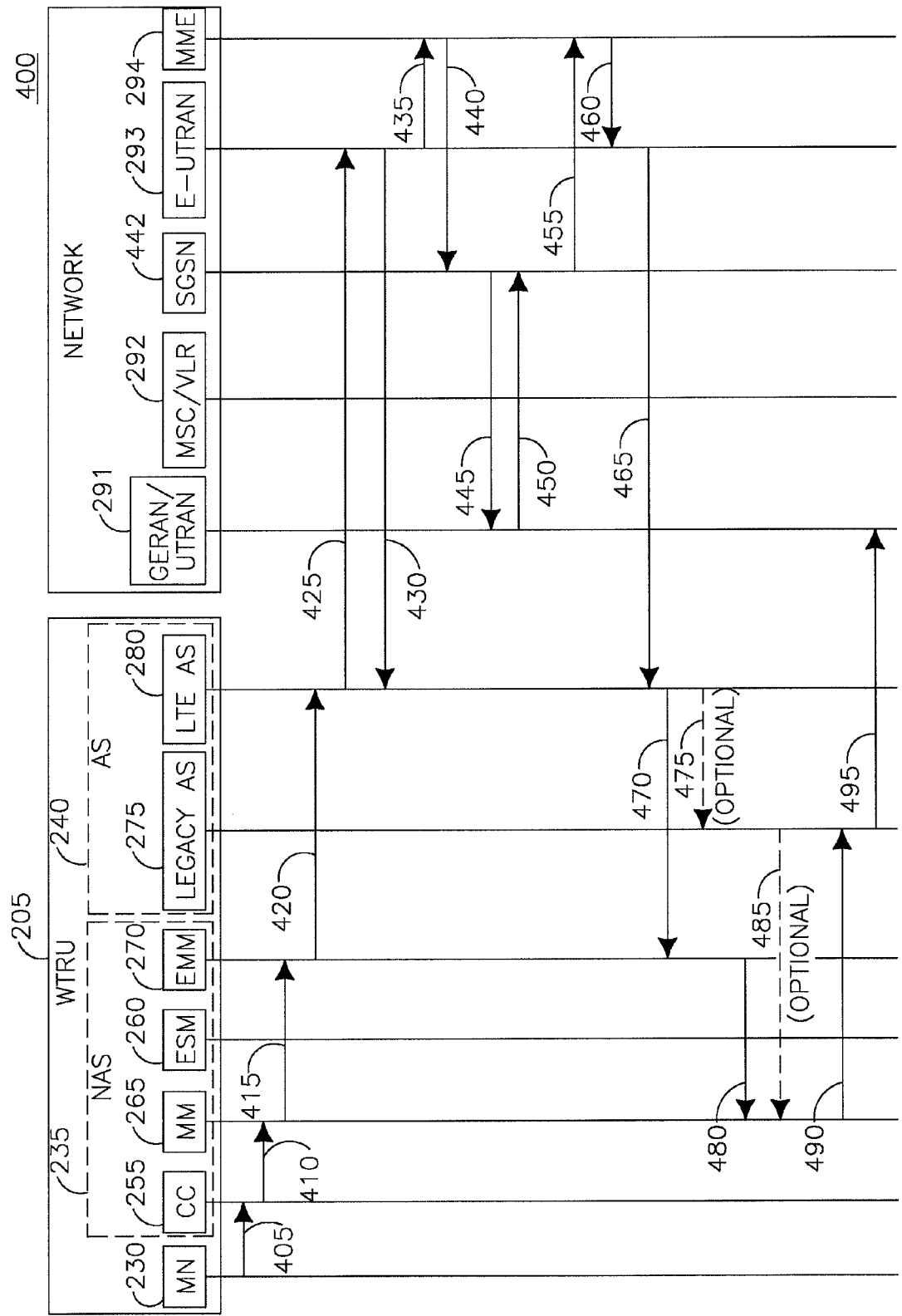
FIG. 4 is a signal flow diagram of an example MO Call setup in Active Mode with ongoing packet session.

FIG. 4 is a signal flow diagram of a method 400 for MO Call setup in Active Mode with ongoing packet session. This example includes that for Mobile Originating (MO) calls in Idle mode. When a call is initiated in the CS domain while the WTRU is in Idle mode on LTE, the MM sub-layer 265 in the NAS 235 notifies the EMM sub-layer 270 (of the NAS) of the request.

Referring to FIG. 4, an "MNCC_SETUP_REQ" primitive is sent 405 by the MN 230 to the CC 255 over the MNCC-SAP defined for the WTRU 205 to initiate an MO establishment of a normal voice call. In response to receiving the "MNCC_SETUP_REQ" primitive, a "MMCC_EST_REQ" primitive is sent 410 by the CC to the MM 265 over the MMCC-SAP defined for the WTRU 205, to establish an MM connection. An "MMEMM_NOTIFY_REQ" is sent 415 by MM 265 to the EMM 270 to notify the EMM 270 of the MO CS call or MO CS service. "MMEMM_NOTIFY_REQ" may be called by some other name without altering the basic concept.

The EMM 270 then sends 420 a Service Request to the LTE AS 280. The Service Request may be, for example, an MO CS service request or any other NAS EMM/ESM message with a similar function to establish a S1 signaling connection with the MME 294. Included in the message sent, is an indication "CS service" or some other cause value with a similar intent.

The EMM 270 sends this message to the LTE AS 280 after performing ciphering and/or integrity protection of the EMM message, if necessary. The EMM 270 may provide the LTE AS 280 with an indication of the originating CS service separate from the NAS message being sent and may also provide a description (e.g., conversational, streaming etc.). Alternatively, the MM layer 265 may indicate directly to the RRC layer of the LTE AS 280 of a MO CS service being initiated (not shown). This indication may include a description of the service, for example whether it is conversational or background.

The LTE AS 280 then notifies 425 the eNB 285 of the MO CS service request along with a description of the CS service such as "Originating Streaming Call" or "Originating Background Call". An RRC message called "EVENT NOTIFICATION" indicates to the eNB 285 that a MO CS service request was received. The RRC may then start a timer after sending this message. If the timer expires before a HANDOVER FROM E-UTRAN COMMAND or equivalent message or any other message as defined below, is received, the WTRU 205 then may move to idle mode and re-select to a cell with CS service available.

As an alternative, the notification of the MO CS service request may be carried in any other RRC message, for example as part of measurement reporting or UL DIRECT TRANSFER) and may include details of the CS service. The details of the CS service may include, for example "Originating Streaming Call" or "Originating Background Call".

Once the eNB 285 receives notification of the MO CS service request, the eNB 285 may send 430 an "EVENT NOTIFICATION CONFIRM" message to confirm initiation of the Relocation procedure. This message may also instruct the WTRU 205 to perform measurements on neighboring cells of other RAT. Alternatively, the eNB 285 may send a MEASUREMENT COMMAND to instruct the WTRU 205 to perform measurements on neighboring cells of other RAT. Another alternative is for the eNB 285 to send some other RRC message. The WTRU 205 may also perform measurements and send the measurement reports to the eNB 285.

The eNB 285 may then either send 435 the UPLINK NAS TRANSPORT message to the MME 294 with the WTRU NAS message or, after receiving the notification of the originating CS service, send a RELOCATION REQUIRED message to the MME 294 with a description of the originating CS service.

The MME 294 then sends 440 a FORWARD RELOCATION REQUEST message to the Serving General Packet Radio Service (GPRS) Support Node (SGSN) 442. The SGSN 442 then sends 445 a PS HANDOVER REQUEST to the Basic Service Set (BSS) in response to the FORWARD RELOCATION REQUEST. The BSS then sends 450 a PS HANDOVER REQUEST ACKNOWLEDGE message back to the SGSN 442. The SGSN 442 then sends 455 the FORWARD RELOCATION RESPONSE message to the MME 294. The purpose of the procedure described in 440-455 is to accomplish resource reservation of the ongoing PS session in the LTE and the transfer of the relative security, MM and other contexts.

Once the MME 294 receives the FORWARD RELOCATION RESPONSE, the MME 294 sends 460 a RELOCATION COMMAND to the eNB 285. The MME 294 has the option to send this after reserving resources for the originating CS service with the target MSC/NB/BS. The MME 294 may also send a NAS message, such as a SERVICE REJECT message, to the WTRU 205.

The eNB 285 then sends 465 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name but which accomplishes a similar purpose. This RRC message may include an upper layer NAS message.

Upon receiving the Handover command, the RRC layer in the LTE AS 280 may provide 470 an indication of the fallback to CS cell to the NAS 235, which may also be used to send any received NAS message. The RRC layer in LTE access 280 may indicate 475 to the target access the parameters received in the handover. The target access may use these parameters to synchronize with the target cell. The target access may optionally confirm receiving the parameters/successful handover to the LTE access 280. The EMM entity 270 may indicate 480 to the MM layer 265 that the terminal is now operating in the CS domain in A/Gb or Iu mode, which may be accomplished via a primitive. The RRC or equivalent layer in target access may provide 485 an indication of the fallback to CS cell to the NAS 235.

The responses to the Handover command may be in any order and are not intended to be sequential and may be performed in any combination. The NAS 235 refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify of CS fallback command received/initiated/completed.

The WTRU NAS 235 is operating 490 in A/Gb or Iu mode and the MM layer 250 is active. As such, it may initiate call setup procedures as per usual with the access stratum of the target access (which is now the current access). The RRC, or equivalent layer of target (now current) access, may begin 495 its defined procedures for receiving a MO CS Call request.

Figure 5:
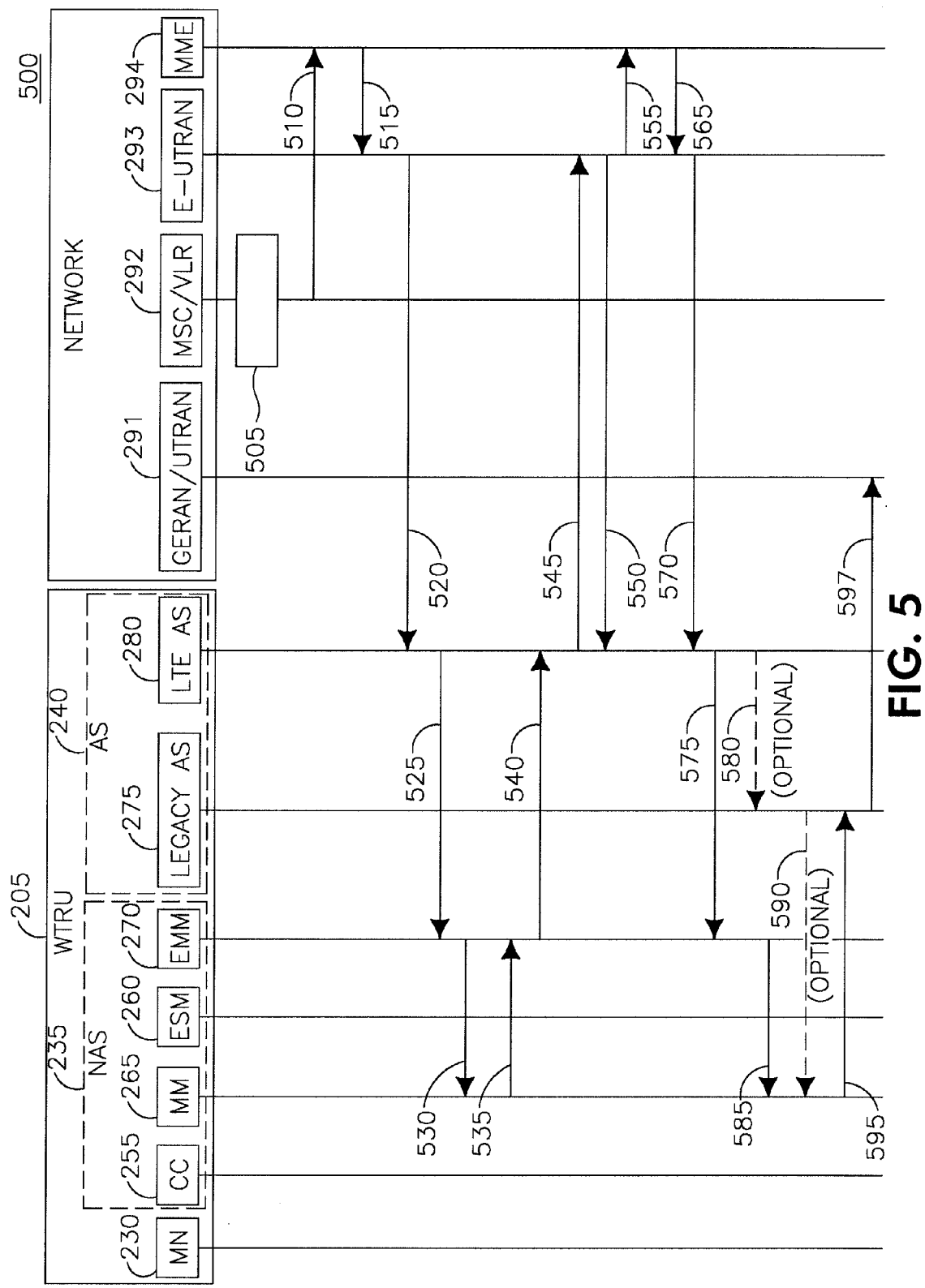
FIG. 5 is a signal flow diagram of an example call setup method for Mobile Terminating (MT) calls including the MT Call setup in Idle Mode.

FIG. 5 is a signal flow diagram of an example call setup method 500 for Mobile Terminating (MT) calls including the MT Call setup in Idle Mode. Referring to FIG. 5, an incoming page for CS service is received 505 at the MSC/VLR 292. The MSC/VLR 292 sends 510 a CS page over a Gs-like interface to the MME 294, which performed the last LA Update on behalf of the WTRU 205. The MME 294 then sends 515 a CS page request to eNB (E-UTRAN) 293 over a S1 interface. The eNB 285 then pages 520 the WTRU 205. The page request may set the Domain Indicator to the CS domain, the cause for paging may indicate CS service, and the paging request may also provide a description of the service (e.g., conversational, background, etc.)

The LTE RRC then notifies 525 the EMM entity 270 in the NAS 235 about the incoming paging request and paging cause. The EMM entity 270 notifies 530 the MM entity 265 of the incoming page request for CS service. The MM entity 265 then responds 535, with a confirmation or a page response.

The LTE RRC may alternately, directly notify the MM entity 265 of the page request, if the paging cause is set to CS domain and/or if the page request is for incoming CS service. The MM entity 265 may then respond as defined in 535. It should be noted that any of the steps 525-535 may be optional and the timing of the steps may be different than that defined above.

Alternatively, the LTE AS 280 may initiate the cell reselection procedure and prioritize the selection priority of GERAN/UTRAN access to prioritize the RAT that supports CS service. Once the GERAN or UTRAN has been selected, the WTRU 205 may provide an indication of the fallback to CS to the NAS 235 as disclosed below, or skip to any step below. Note that this order of this optional alternative may be altered.

The EMM entity 270 then instructs 540 the LTE AS 280 to establish a PS signaling connection. This may be done by means of a primitive. This may also be done, for example, with a SERVICE REQUEST message or any other NAS message. The cause value of the Service Request may be set to Page Response.

As an alternative, the WTRU 205 may indicate to the network if it wishes to accept the incoming CS call in its Service Request or in any other NAS/RRC message in response to the page. This indication may be used by the network in its decision to handover the WTRU to a CS-capable RAT. This indication may be provided to the network after prompting the user about the incoming call and optionally warning the user that it will be in a lower speed access and receiving the user decision. If the user does not wish to be re-directed to the CS-capable RAT this will be indicated to the network in the message as defined above, and the network may choose not to move the WTRU 205 to a CS-capable RAT.

The LTE AS 280 will then initiate 545 procedures to acquire an RRC Connection. This may involve a RACH access and an RRC CONNECTION REQUEST. The LTE AS 280 may set the establishment cause in the RRC CONNECTION REQUEST to a value that indicates an originating CS service. The LTE AS 280 may also set the Domain Indicator IE in the RRC CONNECTION REQUEST to the CS domain, despite the fact that LTE is a PS only access. The establishment cause may provide details of the CS service which include, for example, "Terminating Streaming Call" or "Terminating Background Call".

Alternatively, a new RRC message called "EVENT NOTIFICATION" may be sent after an RRC Connection is established. This message indicates to the eNB 285 that a MT CS service request was received. The RRC may start a timer after sending this message. If the timer expires before a HANDOVER FROM E-UTRAN COMMAND, equivalent message, or any other message as defined below, is received the WTRU 205 may move to idle mode and re-select to a cell with CS service available.

Once the RRC CONNECTION REQUEST is received 550 with the cause value being set to "Terminating CS service" or some other message with a similar intent, the eNB 285 may send 555 an RRC CONNECTION SETUP message to setup Signaling Radio Bearers (SRBs). The SETUP message may include an indication of eNB-initiated Relocation for CS services. This indication may be a single bit. If this indication is present, or based on some other parameters, the RRC layer in the WTRU 205 may decide not to try and initiate an UL DIRECT TRANSFER procedure to send the upper layer NAS message. When the WTRU 205 receives the message, it may stop timer T300 and may start some other timer T1 that will help the WTRU 205 decide the duration of time it needs to wait before it returns to Idle mode.

Alternatively, the eNB 285 may send a RRC CONNECTION REJECT message or some other RRC message which includes, possibly, redirection info for the WTRU 205 indicating the target RAT, the target frequency, or the target cell, and the initiation of the relocation. The WTRU 205, upon receiving this message, may stop timer T300, move to Idle mode and re-select to the indicated RAT, frequency, or cell if indicated. At this point the WTRU RRC may send a RELOCATION COMMAND as will be discussed below.

In another alternative, a new RRC message called "EVENT NOTIFICATION RESPONSE" is sent which indicates to the WTRU 205 that EVENT NOTIFICATION was received. This RRC message may be called by some other name without changing the principle. When the WTRU 205 receives the Event notification response message it may stop timer T300 and start another timer that will help the WTRU decide the amount of time it needs to wait before it goes to Idle mode.

Any combination of the above alternatives may be used. If an RRC Connection and SRBs were setup, the eNB 285 may optionally initiate a measurement procedure so that it may determine to which cell to relocate the WTRU 205. Accordingly, the WTRU 205 may perform measurements and send the measurement reports to the eNB 285.

The eNB 285 then may either send the UPLINK NAS TRANSPORT message to the MME 294 with the WTRU NAS message or, after receiving notification of terminating CS service, a RELOCATION REQUIRED message to the MME 294 with optionally a description of the termination CS service.

The MME 294 sends 565 a RELOCATION COMMAND after optionally reserving resources for the terminating CS service with the target MSC, the target NB, or the target BS. Alternatively, the MME 294 may also send a NAS message, such as a SERVICE REJECT message, to the WTRU 205.

Next, the eNB 285 sends 570 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name but which accomplishes a similar purpose. This RRC message may include an upper layer NAS message.

In response to the Handover command, the RRC layer in the LTE AS 280 may provide 575 an indication of the fallback to CS cell to the NAS 235. This may also be used to send any received NAS message, may be accomplished via a primitive. The RRC layer in LTE access 280 may indicate 580 to the target access the parameters received in the handover. The target access may use these parameters to synchronize with the target cell. The target access may optionally confirm receiving the parameters or successful handover to the LTE access 280, which may be accomplished via a primitive. The EMM entity 270 then may indicate 585 to the MM layer 250 that the terminal is now operating in the CS domain in A/Gb or Iu mode. The RRC or equivalent layer in target access may provide 590 an indication of the fallback to CS cell to the NAS 235.

The example responses to the Handover command may be in any order and are not intended to be sequential and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify of CS fallback command received, initiated, or completed.

The WTRU NAS 235 is operating 595 in A/Gb or Iu mode and the MM layer 250 is active. As such, it may initiate call setup procedures as per usual with the access stratum of the target access, which is now the current access. The RRC, or equivalent layer of target (now current) access, begins 597 its defined procedures for receiving an MO CS Call request.

Figure 6:
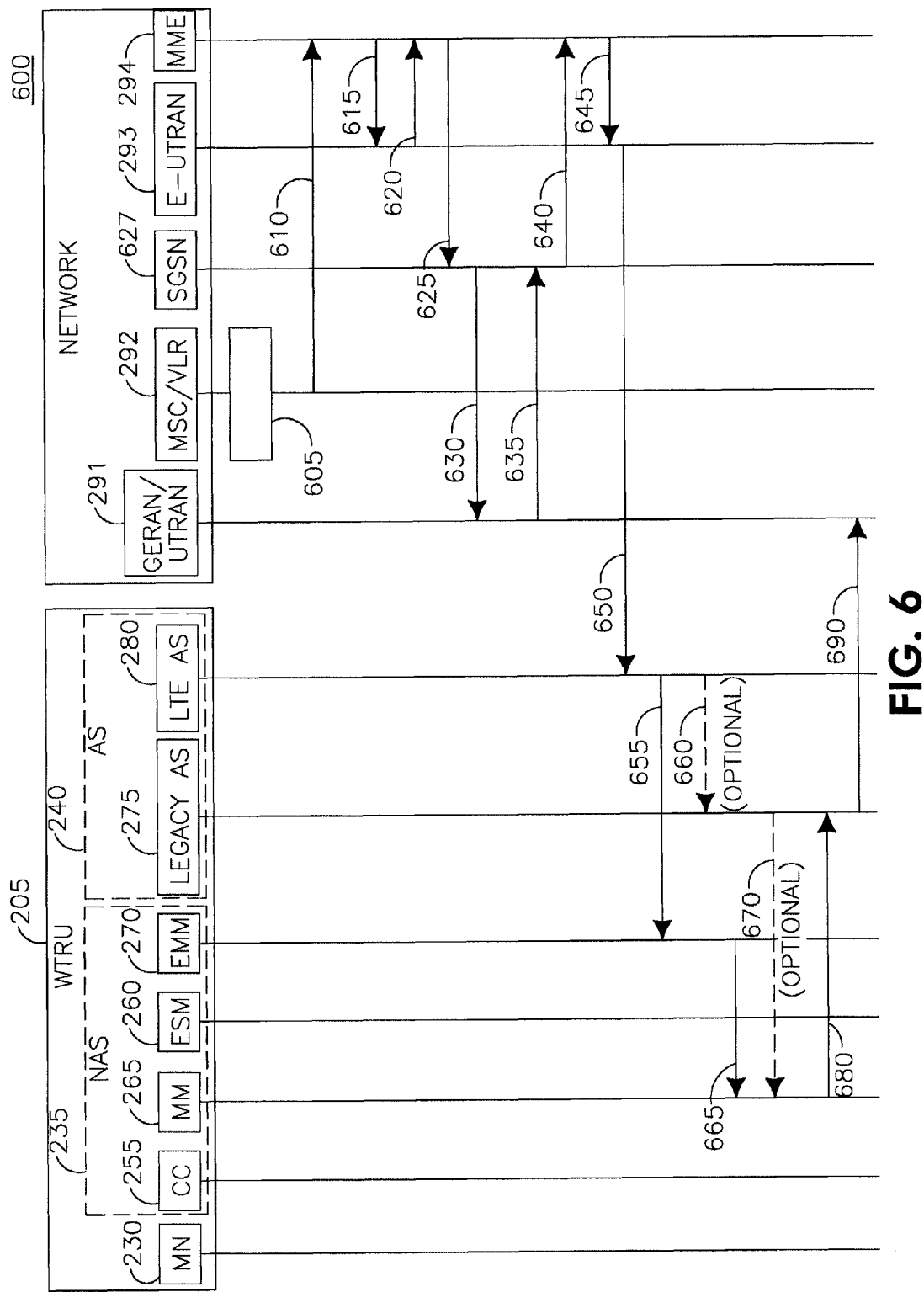
FIG. 6 is a signal flow diagram of an example method for MT Call setup in Active Mode with an ongoing packet session.

FIG. 6 is a signal flow diagram of an example method 600 for MT Call setup in Active Mode with an ongoing packet session. Referring to FIG. 6, the MSC/VLR 292 receives 605 an incoming page for CS service. In response to the received page, the MSC/VLR 292 sends 610 a CS page over the Gs-like interface to the MME 294 which performed last LA Update on behalf of WTRU 205. The MME 294 then sends 615 the CS page request to the eNB (E-UTRAN) 293 over an S1 interface. The eNB 285 then sends 620 the RELOCATION REQUIRED message to the MME 294 after having triggered a measurement report from the WTRU 205 to identify the target cell.

The MME 294 then sends 625 a FORWARD RELOCATION REQUEST message to the SGSN 627. The SGSN 627 sends 630 a PS HANDOVER REQUEST to the BSS/RNC. The BSS/RNC then sends 635 a PS HANDOVER REQUEST ACKNOWLEDGE message to the SGSN 627, which sends 640 the FORWARD RELOCATION RESPONSE message to the MME 294. The purpose of the procedure described in 625-640 is to accomplish resource reservation of the ongoing PS session in LTE and the transfer of the relative security, MM and other contexts.

The MME 294 then sends 645 a RELOCATION COMMAND. In response to the RELOCATION COMMAND, the eNB 285 then sends 650 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name but which accomplishes a similar purpose. This RRC message may include an upper layer NAS message. The RRC message may have a cause value that indicates that reason for handover is a page received for terminating CS service request.

In response to receiving the Handover command, the RRC layer in the LTE AS 280 may provide 655 an indication of the fallback to CS cell to the NAS 235. This may also be used to send any received NAS message. It may indicate that the cause value is incoming CS service page request. The RRC layer in LTE access 280 may indicate 660 to the target access the parameters received in the handover. The target access may use these parameters to synchronize with the target cell. The target access may confirm receiving the parameters or successful handover to the LTE access 280. It may also indicate that the cause value is incoming CS service page request.

The EMM entity 270 may indicate 665 to the MM layer 265 that the terminal is now operating in the CS domain in A/Gb or Iu mode. This may be accomplished via a primitive, which indicates that the cause value is an incoming CS service page request. The RRC or equivalent layer in the target access may provide 670 an indication of the fallback to CS cell to the NAS 235. It also may indicate that the cause value is an incoming CS service page request.

The example responses to the Handover command may be in any order and are not intended to be sequential and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used as a notification of the CS fallback command received, initiated, or completed, and any cause values.

The WTRU NAS 235 is operating 680 in A/Gb or Iu mode and the MM layer 250 is active. It may initiate call setup procedures as per usual with the access stratum of the target access, which is now the current access. It may also indicate that the reason for the call setup request is CS page. The RRC or equivalent layer of the target (now current) access then begins 690 its defined procedures for receiving a MT CS Call request.

At any of the steps above, for example, upon receiving the HANDOVER FROM EUTRAN COMMAND, the WTRU 205 may indicate in any other NAS/RRC message to the network if it wishes to accept the incoming CS call. This indication may be used by the network in its decision to handover the WTRU 205 to a CS-capable RAT. This indication may be provided to the network after prompting the user about the incoming call and warning user that it will be in a lower speed access and receiving the user decision (e.g., okay, not okay). For example, if the user is not okay with being re-directed to CS-capable RAT this will be indicated to the network in the message (as defined above) and the network may choose not to move the WTRU 205 to a CS-capable RAT.

Figure 7:
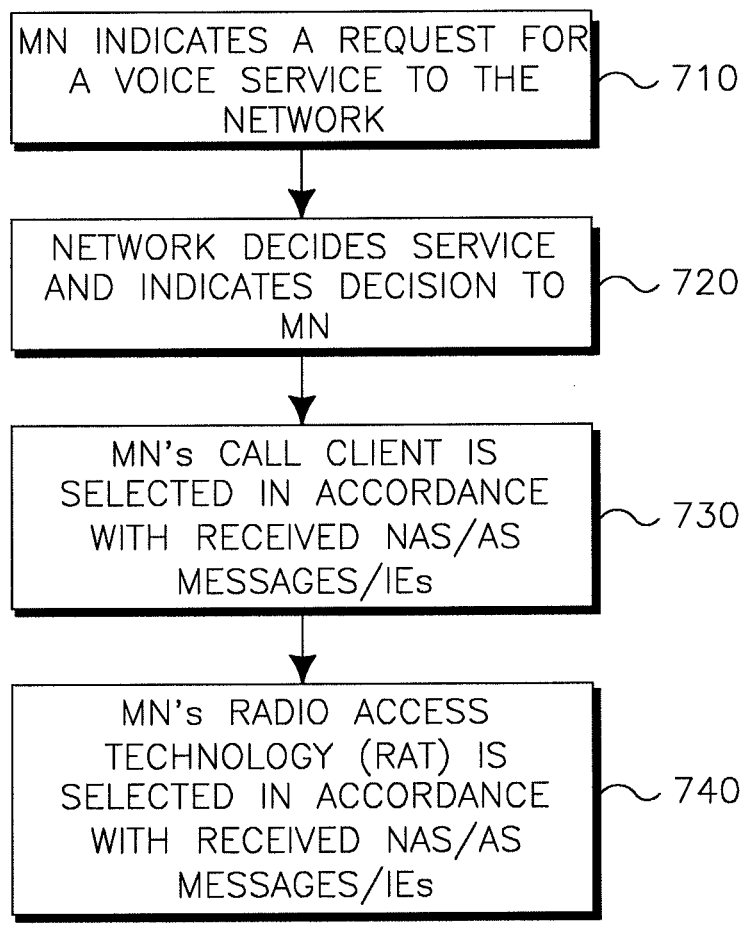
FIG. 7 is a flow diagram of an example method for handling voice client selection.

FIG. 7 is a flow diagram of an example method 700 for handling voice client selection. In accordance with this method 700, at the beginning, the MN utilizes the LTE NAS and LTE AS for sending its signaling messages. The MN indicates 710 a request for a voice service to the network utilizing NAS/AS messages/IEs. The network E-UTRAN/MME, upon consultation with the GERAN/UTRAN and/or MSC/VLR, determines 720 whether the voice call shall be serviced via the E-UTRAN (i.e., the PS VoIP client) or via the UTRAN/GERAN (i.e., the CS voice call client) and then indicates its decision to the MN utilizing NAS/AS messages/IEs. The MN's call client is selected 730 in accordance with the received NAS/AS messages/IEs. The MN's RAT is selected 740 in accordance with the received NAS/AS messages/IEs.

Figure 8:
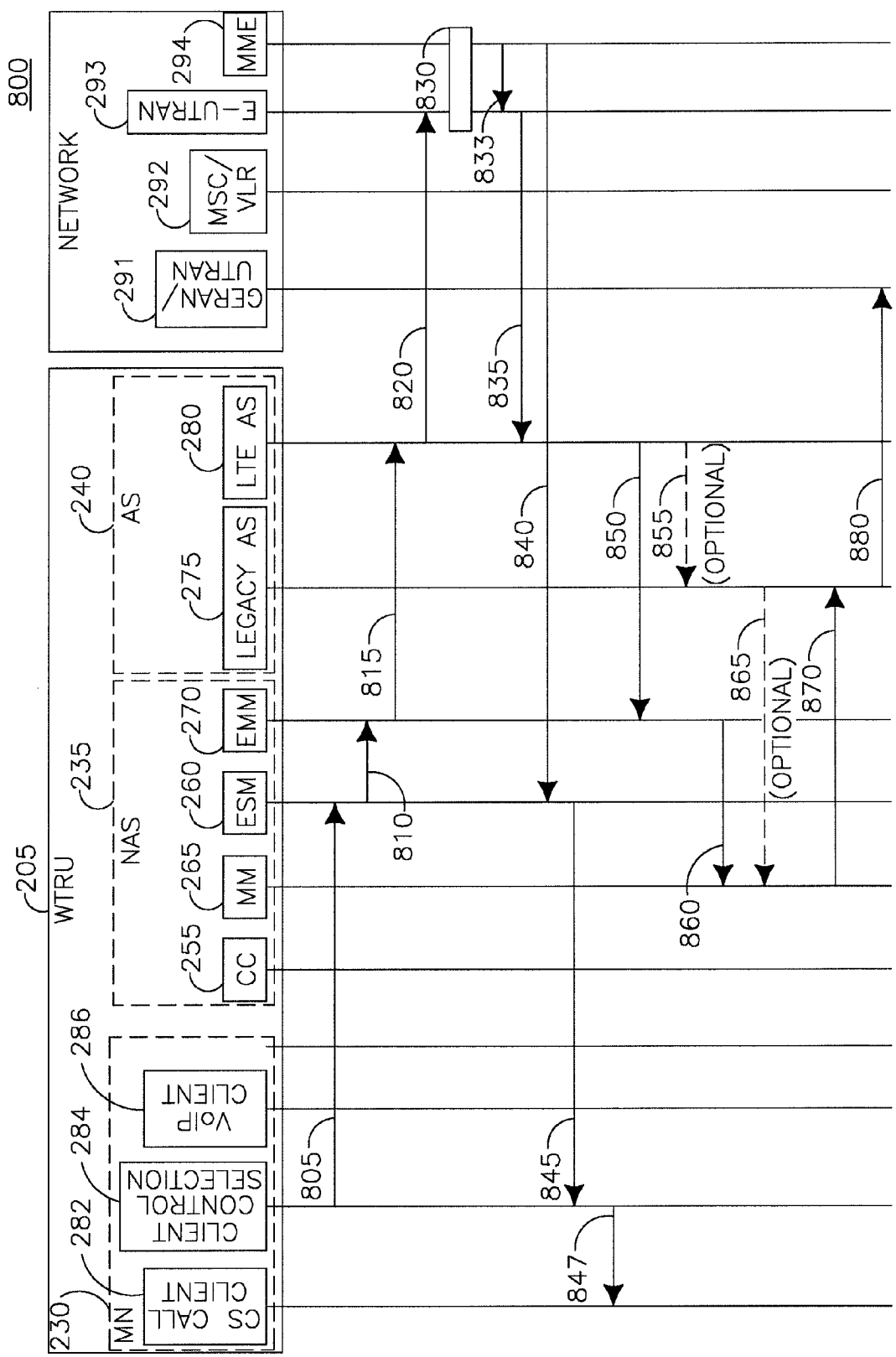
FIG. 8 is a signal flow diagram of an example MO Call setup in Idle Mode.

FIG. 8 is a signal flow diagram of an example method 800 for MO Call setup in Idle Mode. Referring to FIG. 8, an "SMREG-PDP-ACTIVATE-REQ" primitive (or its LTE equivalent) is sent 805 by the MN Client Control/Selection unit 284 to the ESM 260 over the SMREG-SAP (or its LTE equivalent) defined for the WTRU 205 to initiate a PDP Context Activation (or its LTE equivalent) for a MO PS service. A "GMMSM-UNITDATA-REQ" primitive (or its LTE equivalent) is then sent 810 by the ESM 260 to the EMM 270 over the GMMSM-SAP which includes a PDP Context Activation Request (or its LTE equivalent).

The EMM 270 then may send 815 a Service Request or any other NAS EMM/ESM message with a similar intent to establish a S1 signaling connection with the MME 294. A new cause value is included in the message sent that may indicate "voice service" or some other cause value with a similar intent. The EMM 270 then will provide this message to the LTE AS 280 after performing ciphering and/or integrity protection of the EMM message if necessary. The EMM 270 may also provide the LTE AS 280 with an indication of the originating voice service separate from the NAS message being sent and may also provide a description, for example whether it is conversational or streaming.

The LTE AS 280 will then initiate 820 procedures to acquire an RRC Connection. This may involve a RACH access and an RRC CONNECTION REQUEST. In this example, the LTE AS 280 may set the establishment cause in the RRC CONNECTION REQUEST to a value that indicates an originating conversational voice service. The establishment cause may provide details of the voice service including "Originating Streaming Call" or "Originating Background Call". The RRC CONNECTION REQUEST message may include an information element that indicates whether the WTRU 205 supports CS Fallback.

Alternatively, an RRC message called "EVENT NOTIFICATION" may be sent by the WTRU 205 after the RRC connection is established. It indicates to the eNB 285 that an MO voice service request was received. This RRC message may be called by some other name without changing the principle. The RRC may start a timer after sending this message. If the timer expires before a HANDOVER FROM E-UTRAN COMMAND or equivalent message, or any other message as defined below, is received, the WTRU 205 may move to idle mode and re-select to a cell with CS service available.

Once the RRC CONNECTION REQUEST is received with the cause value being set to "Originating voice service" or a cause with a similar intent, the network (i.e., the E-UTRAN 293 and/or the MME 294) decides 830 whether the voice service shall be taken in the CS domain (i.e., via the UTRAN/GERAN RAT) or in the PS domain (i.e., via the E-UTRAN RAT). Such determination may be based on operator or user preferences, or other criteria, such as load balancing criteria, or RAT coverage criteria, or based on whether other PS services will be used or are in usage by the WTRU 205 or not. The MME 294 may then send a relocation command 833.

In response to the network decision, the eNB 285 may then send 835 an RRC CONNECTION SETUP message to setup SRBs. The SETUP message may include an indication of eNB-initiated Relocation for CS services. This indication may be 1 bit. If this indication is present, or based on some other parameters, the RRC layer in the WTRU may decide not to try and initiate an UL DIRECT TRANSFER procedure to send the upper layer NAS message. The WTRU 205, when it receives the message may stop timer T300 and may start some other timer T1, which will help the WTRU 205 decide the duration of time it needs to wait before it goes back to idle.

Alternatively, the eNB 285 may send an RRC CONNECTION REJECT message or some other RRC message (new or different) which includes, possibly, redirection info for the WTRU 205 indicating the target RAT, the target frequency, or the target cell, and may also indicate initiation of the relocation. The WTRU 205 on receiving this message would stop timer T300, move to Idle mode and re-select to the indicated RAT, frequency, or cell if indicated. At this point the WTRU RRC may send a notification to the Client Control/Selection unit 284.

In another alternative, RRC message called "EVENT NOTIFICATION RESPONSE" indicates to the WTRU 205 that EVENT NOTIFICATION was received. This RRC message may be called by some other name without changing the principle. When the WTRU 205 receives the EVENT NOTIFICATION RESPONSE message it may stop timer T300 and start another timer that will help the WTRU 205 decide the amount of time it needs to wait before it switches to Idle mode.

Any combination of the above alternatives may be used. If an RRC Connection and SRBs were setup the eNB 285 may optionally initiate a measurement procedure so that it may determine to which cell to relocate the WTRU 205. Accordingly, the WTRU 205 may perform measurements and send the measurement reports to the eNB 285.

The MME 294 then may send 840 an NAS message or a NAS Information Element (IE) to inform the WTRU NAS 235 (e.g. the ESM 260) of whether the WTRUs CS Call Client or the VoIP (i.e. PS) Client should be utilized for the voice service. The WTRU NAS/ESM 260 notifies 845 a Client Control/Selection unit 284 via a new primitive that indicates which client should be used for voice. The Client Control/Selection unit 284 then notifies 847 the selected voice client accordingly. In FIG. 8, it is assumed that the CS Call Client is selected. Alternatively, the WTRU NAS/ESM 260 may notify the selected voice client directly, without interfacing with a Client Control/Selection function 284.

If the network decided to service the voice call in the CS network, for example via UTRAN/GERAN, the RRC layer in the LTE AS 280 may provide an indication 850 of the fallback to CS cell to the NAS 235. This may also be used to send any received NAS message. The RRC layer in the LTE access 280 may indicate 855 to the target access the parameters received in the handover. The target access may use these parameters to synchronize with the target cell. The target access may optionally confirm receiving the parameters or successful handover to the LTE access 280. This may be accomplished via a primitive. The EMM entity 270 then may indicate 860 to the MM layer 265 that the terminal is now operating in the CS domain in A/Gb or Iu mode. This may be accomplished via a primitive. The RRC or equivalent layer in target access may provide 865 an indication of the fallback to CS cell to the NAS 235. This may be accomplished via a primitive.

The example responses to the network decision may be in any order and are not intended to be sequential and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify of CS fallback command received, initiated, or completed.

The WTRU NAS 235 is operating 870 in A/Gb or Iu mode and the MM layer 250 is active. It may then initiate call setup procedures as per usual with the access stratum of the target access, which is now the current access. The RRC or equivalent layer of the target (now current) access begins 880 its defined procedures for receiving a MO CS Call request.

Similar concepts to the ones illustrated previously may be supported and applied to the following by combining the concepts illustrated in the corresponding prior sections. These concepts, for example, include MO Call setup in Active Mode with ongoing packet session, MT Call setup in Idle Mode, and MT Call setup in Active Mode with ongoing packet session.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (WTRU), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
    a processor comprising:
        a Non-Access Stratum (NAS) configured to
        determine whether to perform a Circuit Switched (CS) fallback based on an Internet Protocol (IP) Multimedia Subsystem (IMS) registration status, and
        send a service request indicating a request to perform a Circuit Switched (CS) fallback on a condition that the WTRU is attached to a CS domain; and
    an Access Stratum (AS) configured to
        receive the CS service request from the NAS,
        send an indication of the CS service request in a Radio Resource Control (RRC) message to an Evolved Universal Mobile Telecommunications System (UMTS) Terrestrial Radio Access Network (E-UTRAN), wherein the RRC message includes CS service information, and
        receive a handover command in response to the CS service request.

2. The WTRU of claim 1, wherein the AS is further configured to send an indication of the CS fallback to the NAS.

3. The WTRU of claim 1, wherein the AS comprises:
    a legacy AS; and
    a Long Term Evolution (LTE) AS configured to receive the service request from the NAS, send the indication of the CS service request in the RRC message to the E-UTRAN, and receive the handover command.

4. The WTRU of claim 3, wherein the legacy AS is configured to send an indication of the CS fallback to the NAS on a condition that the legacy AS receives a handover parameter from the LTE AS.

5. The WTRU of claim 1, wherein the NAS comprises:
    a Mobility Management (MM) unit configured to notify an Evolved Packet System (EPS) Mobility Management (EMM) of a CS call, wherein the EMM is configured to send a notification of the service request to the AS and send an indication to the MM that the WTRU is operating in a CS domain.

6. The WTRU of claim 1, wherein the AS is configured to set an establishment cause in the RRC message to a value that indicates an originating CS service.

7. The WTRU of claim 1, wherein the AS is configured to provide details of the CS service in an establishment cause.

8. The WTRU of claim 1 further comprising:
    a Mobile Node (MN) configured to determine whether to fallback to CS based on an Internet Protocol (IP) Multimedia Subsystem (IMS) registration status.

9. A method for circuit switched (CS) fallback performed by a wireless transmit/receive unit (WTRU), the method comprising:
    determining whether to perform a CS fallback based on an Internet Protocol (IP) Multimedia Subsystem (IMS) registration status;
    receiving a CS service request from a Non-Access Stratum (NAS) of the WTRU, the service request indicating a request to perform a CS fallback on a condition that the WTRU is attached to a CS domain;
    sending an indication of the CS service request in a Radio Resource Control (RRC) message to an Evolved Universal Mobile Telecommunications System (UMTS) Terrestrial Radio Access Network (E-UTRAN), wherein the RRC message includes CS service information; and receiving a handover command in response to the CS service request.

10. The method of claim 9 further comprising:
sending an indication of the CS fallback to the NAS.

11. The method of claim 9 further comprising:
notifying an Evolved Packet System (EPS) Mobility Management (EMM) of a CS call;
sending a notification of the service request to an Access Stratum (AS) of the WTRU; and
sending an indication to a Mobility Management (MM) unit that the WTRU is operating in a CS domain.

* * * * *